(12) United States Patent
Richmond

(10) Patent No.: US 8,108,733 B2
(45) Date of Patent: Jan. 31, 2012

(54) MONITORING DISTRIBUTED SOFTWARE HEALTH AND MEMBERSHIP IN A COMPUTE CLUSTER

(75) Inventor: Michael A. Richmond, Mountain View, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/778,177

(22) Filed: May 12, 2010

(65) Prior Publication Data

US 2011/0283149 A1  Nov. 17, 2011

(51) Int. Cl.
*G06F 11/00* (2006.01)
*G06F 11/20* (2006.01)

(52) U.S. Cl. ........... 714/43; 714/4.11; 714/55; 707/737; 709/201; 709/223

(58) Field of Classification Search ............ 714/43, 714/55, 11; 709/223, 201; 707/737
See application file for complete search history.

(56) References Cited

U.S. PATENT DOCUMENTS

| | | | |
|---|---|---|---|
| 6,721,502 B1 * | 4/2004 | Al-Salameh et al. ............ 398/3 |
| 6,847,993 B1 * | 1/2005 | Novaes et al. ................ 709/221 |
| 7,016,946 B2 * | 3/2006 | Shirriff ........................ 709/221 |
| 7,287,180 B1 * | 10/2007 | Chen et al. ..................... 714/4.3 |
| 7,664,994 B2 * | 2/2010 | Pomaranski et al. ........ 714/47.1 |
| 7,908,251 B2 * | 3/2011 | Jones et al. .................... 707/674 |
| 2003/0041138 A1 | 2/2003 | Kampe et al. |
| 2003/0067871 A1 * | 4/2003 | Busi et al. ...................... 370/222 |
| 2004/0010716 A1 | 1/2004 | Childress et al. |
| 2004/0088396 A1 * | 5/2004 | Hammons et al. ............ 709/223 |
| 2006/0195561 A1 | 8/2006 | Keane et al. |
| 2006/0242453 A1 | 10/2006 | Kumar et al. |
| 2007/0006015 A1 * | 1/2007 | Rao et al. .......................... 714/4 |
| 2007/0022318 A1 | 1/2007 | Copenhaver et al. |
| 2009/0113034 A1 * | 4/2009 | Krishnappa et al. .......... 709/223 |

* cited by examiner

*Primary Examiner* — Joseph Schell
(74) *Attorney, Agent, or Firm* — Kunzler Needham Massey & Thorpe

(57) ABSTRACT

Techniques for monitoring distributed software health and membership of nodes and software components operating in a compute cluster are disclosed. In one embodiment, each node in the compute cluster operates a watchdog monitoring component in addition to software operating components. The watchdogs are provided with a list of all nodes in a compute cluster that identifies every node's neighboring nodes. Each watchdog checks the health of one of its neighboring node, ensuring that this neighboring node is healthy and is operating successfully. Additionally, each watchdog verifies the cluster membership of its other neighboring nodes to ensure that the cluster is operating an adequate number of operating nodes, and that an adequate number of watchdogs are present in the cluster. If an unhealthy or non-member node is identified, the watchdog may initiate corrective action and attempt to restore the node to a correct operational state.

20 Claims, 4 Drawing Sheets

MONITORING DISTRIBUTED SOFTWARE HEALTH AND MEMBERSHIP IN A COMPUTE CLUSTER

FIELD OF THE INVENTION

The present invention generally relates to software components and processes operating within distributed computer systems. The present invention more specifically relates to techniques and configurations for monitoring and controlling the status of components and processes within a compute cluster such as a cluster that operates through use of distributed computing systems.

BACKGROUND OF THE INVENTION

Modern software systems typically have a complex collection of independent software programs/components that work collectively to provide the services and functionality of a system as a whole. These individual software components often have error and failure modes that may not impact other components in the system. Errors and failures will usually impact the entire software system, however, by preventing proper operation or causing incorrect behavior in the system. If the software system needs to be highly available and fault-tolerant, then some mechanism must be introduced to monitor the individual software components and ensure that each is operating correctly. Existing monitoring methods do not efficiently verify the correct operation of software operating in distributed computer systems. Enhanced techniques are needed to monitor the components and processes operating (and failing to operate) within distributed, non-centralized software and computing systems.

BRIEF SUMMARY OF THE INVENTION

One aspect of the present invention provides monitoring and status verification capabilities for software systems that operate in distributed settings. For example, in a highly-available distributed cluster of compute nodes, all of the software components running in the cluster operate together and function as a distributed software system. The distributed software system implements behaviors and services provided by the appliance or programmed function, and therefore works as a whole as it processes tasks dispersed across multiple locations.

For the system as a whole to work correctly, all components in the many distributed software locations (i.e., nodes) must be operating correctly in a healthy state. The complexity of a distributed software system makes it necessary to have some number of health monitoring components in the system if the system is to be highly-available to users. These monitoring components will monitor the overall system, identify individual components that are in an unhealthy state (e.g., an error state or a failure), and act to restore any unhealthy component to a health. Similarly, monitoring components are responsible to ensure that the cluster has a full complement of nodes operational in the cluster. If nodes are allowed to drop out of the cluster due to failures, and if no verification of cluster membership is performed to recognize such a condition, then over time in the presence of errors the cluster will degrade to non-operation.

In one embodiment of the present invention, a plurality of monitoring components are configured to provide a distributed, yet coordinated, approach to monitor the health of a distributed cluster. The presently disclosed distributed monitoring approach avoids the drawbacks inherent in a centralized monitoring approach, while also avoiding the complexity inherent in a replicated distributed monitoring approach. The health monitoring components of the present disclosure operate separately yet in conjunction to achieve a "global view," and therefore obtain an accurate determination of healthy and unhealthy nodes within the system.

Specifically, as disclosed in this embodiment, each node in the cluster that runs a software component also runs a monitoring component. The monitoring component running on each node (for example, node A) is responsible for periodically checking the health of a nearby node and software components running on the nearby node (for example, node B). In one embodiment, the nearby node is determined based on the fact that node B is next to node A in an ordered circular-list of cluster members.

In a further embodiment, the monitoring component is also responsible for checking the cluster membership of nearby nodes. Verifying cluster membership will ensure that a full set of nodes remain operational in the distributed system, and that no gaps exist in the series of health checks being performed by the member nodes. Further, by verifying cluster membership, the monitoring nodes can take corrective action if checked nodes are identified as missing from the cluster, such as either rebooting the node or removing the node from the cluster membership. By checking and pruning the membership of the nodes within the cluster, the monitoring functionality will ensure that the overall system operates in a complete chain and that no gap in monitoring coverage will arise.

The monitoring functions described above ensure that all nodes are periodically checked within the compute cluster, while additionally ensuring that the particular software components running on individual nodes remain in a healthy and operational state. When unhealthy components are found, the monitoring component may initiate steps to automatically correct the health of the component (or, if so configured, to log the event, alert another system, or alert a user to take corrective action). The monitoring functionality also ensures that compute nodes maintain membership in the compute cluster by identifying nodes that are missing from the cluster, with such appropriate action to either re-introduce or remove the node from the cluster.

In one specific embodiment described herein, a method for monitoring distributed software health and membership in a compute cluster includes generating an ordered list of the nodes in the cluster, and performing a health check and membership check operations with use of this ordered list of nodes. The ordered list provides a circular representation of all nodes in the plurality of nodes that are expected to be operational in the compute cluster. This ordered list is made available to each of the plurality of nodes. This ordered list may be refreshed prior to conducting check operations or at defined intervals.

Each of the plurality of nodes has a watchdog monitoring component in addition to the various software components that operate on the node. The watchdog component on each node (and more precisely, each node having a watchdog component that is in an operational state) is used to execute the health and membership checks on each node's neighbors in the compute cluster. Before proceeding with the health and membership checks, the compute cluster may be allowed to stabilize for a defined period of time. The health and membership checks may also be repeated at various intervals.

In this embodiment, the health check is performed with an operational watchdog component on each node. The health check involves checking a health status of a first neighbor node to a first direction of the operational node in the ordered list of nodes (for example, in a right direction in the ordered list). If the health status of the first neighbor node is unhealthy, a specified restorative action is performed on the neighbor node. This health check is repeated from all nodes having an operational watchdog component.

Next, a cluster membership check is conducted with the watchdog component again from each node having an operational watchdog component. This includes the steps of verifying membership in the compute cluster of a second neighbor node to a second direction (for example, in a left direction, thus the neighbor node to the left in the ordered list) of the operational node in the ordered list of nodes. If the neighbor node is not a member of the compute cluster, such as if the neighbor is powered-down, another restorative action is performed on this neighbor node. In further embodiments, the cluster membership check verifies additional neighbor nodes to the second direction of the healthy node in the ordered list of nodes until operational members are located.

As discussed herein, the restorative action performed on the first neighbor node may include restarting software components configured to execute on the first neighbor node. Alternatively, hardware associated with the unhealthy or non-member node may be power cycled. These restorative actions may be repeated up to a predefined number of times, and/or the node may be removed from the cluster's operations.

In another specific embodiment of the present invention described herein, the health of one or more nodes within a compute cluster is monitored. This includes the steps of obtaining a list of nodes expected to operate within the compute cluster, and performing a health check from each node within the compute cluster having an operational watchdog component. Each node performs a health check on one or more of its neighboring nodes of the node to discover unhealthy nodes local to it in the compute cluster. The neighboring nodes are determined by neighboring relationships to the node in the list of nodes.

In this embodiment, if unhealthy nodes are identified, an attempt is made to restore to a healthy and operational state in the compute cluster. The health check is further initiated from every other node within the compute cluster having an operational watchdog component. Thus, nodes restored to a healthy state will eventually perform their own health checks on neighbors.

Other specific embodiments of the present invention provide for a distributed cluster computing system configuration comprising a plurality of nodes, a processor, a memory unit, and instructions stored within the memory unit for monitoring health and/or membership of distributed software operating across the plurality of nodes as described herein. Additionally, another specific embodiment of the present invention provides for a computer program product for monitoring health and/or membership of distributed software operating across a distributed compute cluster, with the computer program product comprising a computer readable storage medium having computer readable program code embodied therewith to implement the techniques described herein.

DETAILED DESCRIPTION OF THE INVENTION

Figure 1:
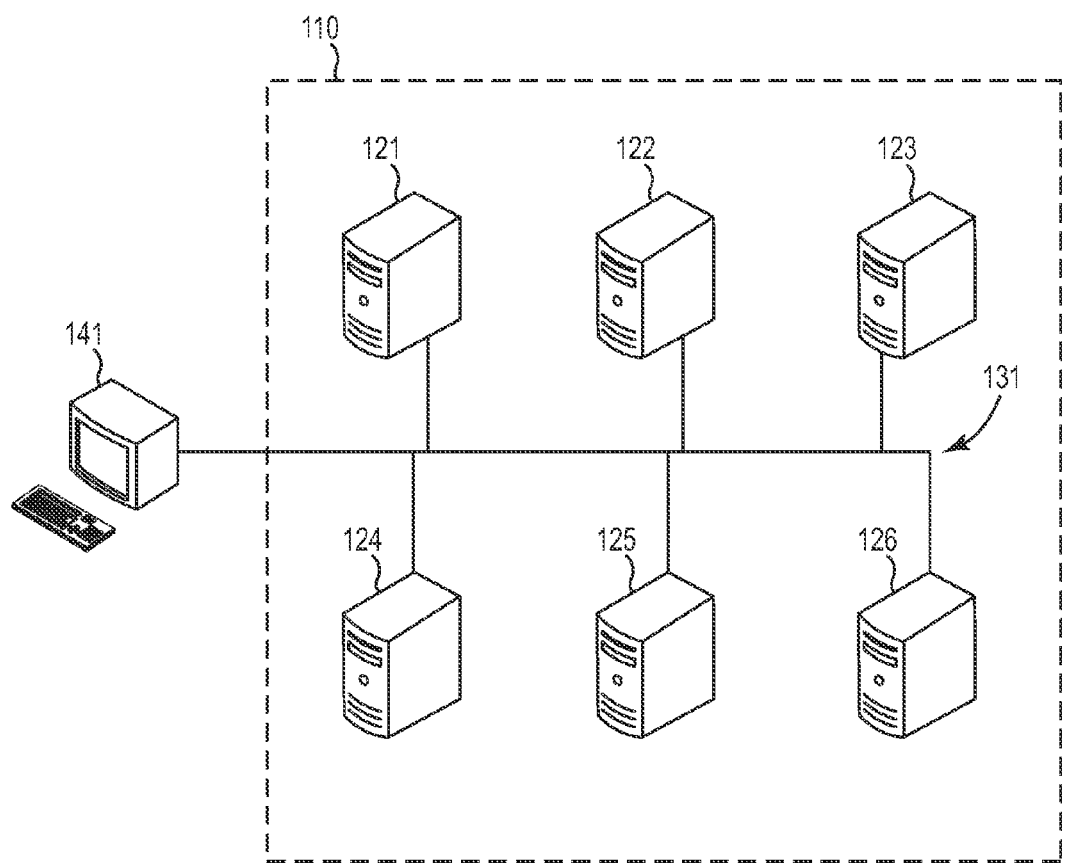
FIG. 1 illustrates an example compute cluster having a set of distributed software processing nodes configured to operate in conjunction with one embodiment of the present invention.

One aspect of the present invention provides monitoring and failure response capabilities for complex software systems, such as distributed application servers and clusters that must be operated in a highly-available (HA) state. In such complex software systems, a number of independent software components run on separate units of work. These software components are designed to automatically fail-over to other compute nodes in the cluster if hardware or other failures occur on nodes within the cluster.

A software component is considered to be "healthy" if it is functioning in a normal operating state. If a faulty or "unhealthy" component is identified, then the system monitor will need to take some action to correct the fault from the component and thereby return the system to correct operation. In a centralized software system, it is relatively straightforward to implement a monitoring component that models the software system and uses this model to monitor the status of individual components. The monitoring component can then perform corrective actions as required to maintain system health. This approach works well if the software system is run on a single physical machine, because the monitoring component can observe the whole system directly.

In a distributed computing cluster, where there are multiple compute nodes each running parts of the software system, a centralized approach to system monitoring has one key drawback: a central point of failure. Typically a distributed system is used to improve the resiliency of the system by providing multiple compute nodes that can perform work. Although it would be possible to implement a centralized component to monitor the health status of software components across a distributed cluster, this approach has the disadvantage that if the monitoring component fails then the cluster will no longer be fault-tolerant. This is known as the central-point-of-failure problem.

One way to mitigate the central-point-of-failure problem is by replicating the monitoring component to multiple points in the cluster with use of distributed monitoring components. Using distributed monitoring components to monitor a distributed computing system comes at the expense of significantly increasing the complexity of the monitoring components. The added complexity is required to determine which of the multiple monitoring components is responsible for monitoring the cluster at any given time. Only one monitoring component at a time can be "in charge" of remedying or delegating the responsibility of resolving problems within the cluster. Otherwise race-conditions will occur when multiple monitors attempt to correct the health of the same nodes and system components.

Further, health monitoring components may have limited effectiveness of monitoring failures in a distributed system if health status checks become lengthy. Health status checks may become lengthy in distributed systems in part due to the network hops and processing required to monitor all nodes in the cluster. These and other limitations as commonly encountered in the art are addressed by the following techniques.

To ensure resiliency of operation for software components throughout the cluster, the present invention includes a distributed mechanism that is capable of monitoring the health of the overall cluster. This distributed mechanism may be responsible for monitoring the health of individual software components in the cluster, monitoring membership in the cluster, and taking corrective action if it finds problems with the health of components or identifies nodes that are missing from the cluster. Therefore, this distributed monitoring functionality provides some of the same benefits as a centralized monitoring mechanism (a global view of health status and reduced complexity as compared to redundant distributed monitoring), without the problems of a centralized system (namely, a central point of failure).

In one embodiment, a monitoring component is started on each node in the cluster when the node boots. For simplicity, this monitoring component is referred to in the following text as a "watchdog." Each watchdog is responsible for periodically checking the health of one node in the cluster and checking the membership status of a sequence of nodes (as further discussed below). In one specific embodiment described herein, the watchdog operates as a software process executing within an operating system of a computer system. In other embodiments, the presently disclosed watchdog may be implemented within an embedded system, as a software application interfacing directly with hardware components, within a hardware controller, or with other suitable combinations of hardware and software.

The watchdog determines which node to check based from data that lists all nodes that are statically configured as part of the compute cluster. Thus, each watchdog is responsible for ensuring the health of a neighboring node, and ensuring that a sufficient number of nodes remain functional members of the cluster (so that in turn other watchdogs in the cluster will verify the health of these other watchdogs' neighboring nodes).

In a further embodiment neighboring nodes are located and determined as follows. Each node in a list of nodes within the compute cluster is provided an integer node number indicating the defined order of nodes in the cluster. The static list of nodes in the cluster and their position in the cluster list generally must stay unchanged during operation of the cluster. There is no requirement, however, to start the nodes synchronously, or in any pre-determined order. Once a circular list of nodes is determined, nodes may be rebooted at any time without impacting the ability of the remaining watchdogs to monitor the cluster.

FIG. 1 provides an illustration of a distributed software system 110 (a compute cluster) having a plurality of computing nodes 121, 122, 123, 124, 125, 126. The nodes are networked together through an interface 131, and provide usable data or operations on behalf of some requested process initiated by an external system such as system 141. Software operations then execute on each node to complete requested processes and operations. Those skilled in the art would recognize that nodes may comprise various combinations of hardware and software components, although in some embodiments the various nodes of distributed systems may be structured in entirely-software form, be partially or wholly virtualized, or be positioned on hardware including multi-cpu or multi-core processing systems.

As part of the compute cluster 110, each node has a connection to other nodes through the network interface 131 and is capable of learning information about which other nodes are part of the cluster, communicating with other nodes, and discovering whether other nodes are operating correctly. In the configuration described herein, each node is configured to be responsible for the health of its neighbors. From the combination of each node's individual view of health, a global view of the cluster's health can be provided.

The various embodiments of the present invention enable monitoring of nodes in a compute cluster whether the various nodes are running the same software functions (generally referred to as a symmetric distributed system) or different software functions (generally referred to as an asymmetric distributed system). In either case, the monitoring functionality initiated from the watchdogs may verify the health of other node software functions and take remedial action as necessary.

Within this configuration of a distributed software setting, the present invention provides "health check" and "membership" monitoring from a watchdog monitor that is configured to execute upon each node. In one embodiment, the operation of a watchdog monitoring component works as follows. On startup, the watchdog component first sleeps for a period of time to allow the cluster to stabilize. Once the cluster has been allowed to stabilize, the watchdog obtains a statically defined list of all nodes in the cluster, and sorts a list based on the node number or some other criteria. This static list is held in memory by the watchdog and is used as the complete view of cluster membership during watchdog processing. The watchdog on each operational node then uses this list of nodes to perform health check and membership verifications on neighboring nodes, eventually effecting operations throughout the entire cluster.

As an optimization to allow addition/removal of nodes to/from the cluster, the watchdog may provide a mechanism to request that the static node list be rebuilt. This operation must be requested on all watchdog components at the same time in the cluster to ensure consistent global operation of the monitoring components. Therefore, one embodiment allows the members of the cluster to be added or removed without requiring a shutdown of the cluster operations. In a further embodiment, the static cluster member list is updated only at the start of each watchdog processing cycle.

Each watchdog processing cycle consists of sleeping for a period of time (on the order of 5 to 10 minutes in one implementation) followed by the health monitoring and membership checking activity. The length of the sleep period determines how responsive the watchdog can be to detect component errors and outages in the cluster. After sleeping, the watchdog obtains the list of currently active nodes believed to be running in the cluster. This list is sorted and health monitoring is performed based on the sorted list of running nodes. From this list the watchdog may identify its right-side neighbor node (or "health-check neighbor node") to the current node. The right-side neighbor node is the entry in the running node list with a node number that is the next highest in the list when compared to the current node.

The node list is stored in data structures that allow traversal of the data in a well-defined sequence such that all traversals of the list in any given direction results in the same ordering of the list elements. Traversal of the list may be performed in a forward (or increasing) direction, or in a backwards (or decreasing) direction. Sequential traversal of the list enables circularity such that traversal past the last element of the traversal sequence results in the retrieval of the first element in the traversal sequence. This circular traversal property occurs irrespective of the direction of traversal. Restated, traversing the list in a forward direction produces the first element in the list immediately after producing the last element in the list; and traversing the list in a backwards direction produces the last element in the list immediately after producing the first element in the list.

In one embodiment, the list of nodes is provided as a circular sequence that wraps to the first element in the sequence if there is an index overflow, or to the last element if there is an index underflow, and allows navigation of the list in either direction. As those of ordinary skill in the art would understand, the list of nodes may be implemented as a linked-list, a doubly-linked list, hash table, dynamic array, or another data structure that can provide a circular sequence of nodes that can be traversed in either direction.

Figure 2:
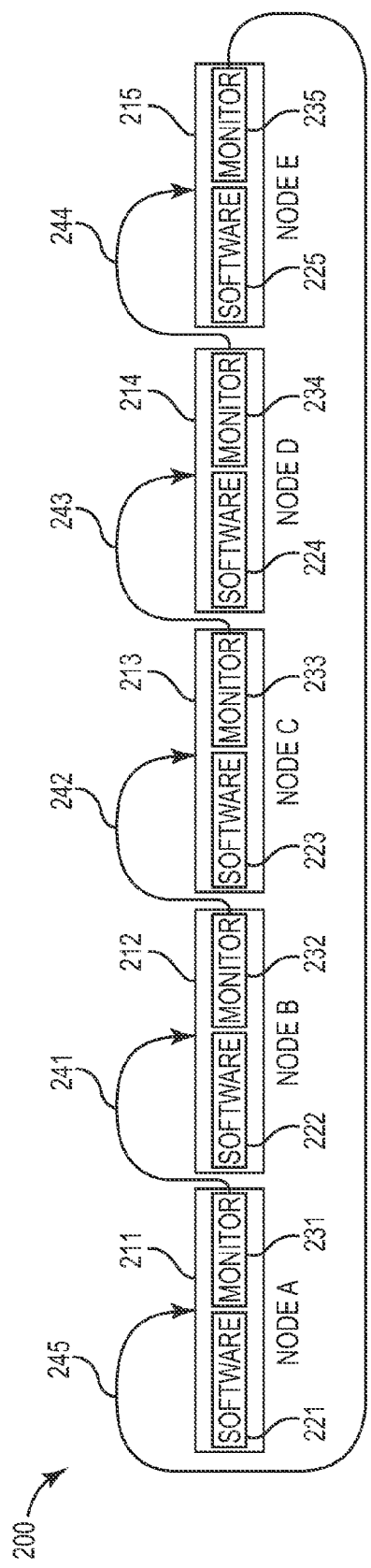
FIG. 2 illustrates an example health check operation performed on a set of distributed software processing nodes according to one embodiment of the present invention.

FIG. 2 illustrates a health check operation 200 running on a set of nodes within a compute cluster according to one embodiment of the present invention. Node A 210 defines its health-check neighbor as the node to the right of Node A in a sorted list of running nodes. (As suggested above, sort order is based on an integer sort of unique node numbers, and may be sorted in other ways.) Thus, the right-side health check neighbor for Node A 211 is Node B 212.

The watchdog monitor 231, 232, 233, 234, 235 on each node 211, 212, 213, 214, 215 respectively performs a number of system-dependent checks on its identified health-check neighbor node to determine the hardware and software health status of the node. These checks are signified by operations 241, 242, 243, 244, and 245. Thus, the watchdog monitor is responsible for checking the overall health of its health-check neighbor node, including any software component or monitoring component within the health-check neighbor node.

If there is a problem with the health of the health-check neighbor node, then the watchdog is responsible for correcting the problem. If the problem is isolated, the problem may be corrected by simply restarting a software component or by refreshing the health-check neighbor node. Finally, if necessary, the component or hardware associated with the node may be restarted or power-cycled to correct the problem.

Thus, for the overall health check process depicted in FIG. 2, watchdog monitor 231 on Node A 211 checks the health of Node B 212 (shown with check 241), the watchdog monitor 232 on Node B 212 checks the health of Node C 213 (shown with check 242), the watchdog monitor 233 on Node C 213 checks the health of Node D 214 (shown with check 243), the watchdog monitor 234 on Node D 214 checks the health of Node E 215 (shown with check 244), and the watchdog monitor 235 on Node E 215 checks the health of Node A (shown with check 245).

An example of some of the types of checks might be performed on a node to try to verify the health of the software components include: use of ssh to issue a command on the node being checked (suitable commands include the Linux true command); use of a ping command to the network interfaces on the node; verification that the shared filesystems are mounted on the node; verification that the watchdog is running on the node being checked; and many other health operations to ensure that software components are in a healthy state.

If any of the above health checks fail, then the node may be determined as unhealthy. As previously described, the health-check operation may perform different responses when an unhealthy component is detected. For example, low-cost operations might be first deployed on the node software, such as reinitializing or restarting a software process. If low-cost operations fail, then a high-cost option such as rebooting the node hardware can be tried, knowing that the high-cost option results in an extremely high chance of returning to full health.

Although the health check operation will detect many if not all health problems in the cluster, gaps will exist in the list if multiple nodes are powered down or become unavailable. Therefore, in order to ensure that a complete health cycle is executed and enough healthy nodes are active to meet highly available needs in the cluster, nodes are checked in the opposite direction as the health check to ensure that they remain members of the cluster. This is referred to in the following disclosure as a "membership check" operation.

Figure 3:
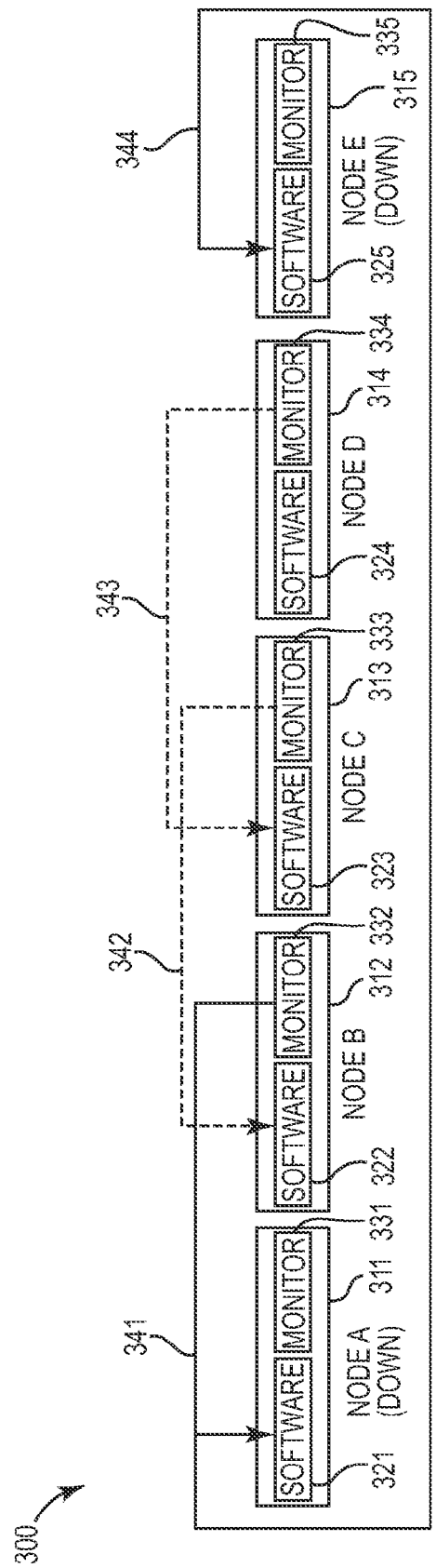
FIG. 3 illustrates an example cluster membership check operation performed on a set of distributed software processing nodes according to one embodiment of the present invention.

FIG. 3 depicts a membership verification operation being performed on a cluster according to one embodiment of the present invention. The membership verification operation verifies that the nodes that "point back" remain members of the cluster. In other words, a membership operation on node B verifies that the node responsible for its health (Node A) remains a powered up, functioning member of the cluster and ready to intervene with its watchdog if Node B ever fails.

FIG. 3 depicts a membership verification operation being performed in the opposite direction as the health check operations depicted in FIG. 2. The direction of performing the health check and membership checks, in left-to-right or a right-to-left order is insignificant; rather what matters is that each node in the cluster is subject to a health check from another node, and that a full membership check is performed on the cluster in order to keep the list of nodes current and therefore prevent additional failures from going unrecognized.

In the embodiment depicted in FIG. 3, the watchdog defines the left-neighbor "membership-check node" as the node with the next smallest node number from the current node in the static node list in cluster 300. After conducting the periodic health check, the node watchdog monitor identifies any continuous sequence of left-neighbor nodes that are not part of the cluster.

As shown in FIG. 3, watchdog monitor 332 within Node B 312 initiates membership check operations 341 and 344 on its left-neighbor nodes, and recognizes that the software components 321, 325 operating within Node A 311 and Node E 315 respectively are not functioning. The watchdog monitor 331 can then take corrective action to bring any nodes not part of the cluster back into normal operation. This corrective action typically consists of refreshing or rebooting the hardware for affected nodes. In this illustration, Node B 312 will identify Node A 311 and Node E 315 as candidates to be rebooted if these nodes are not on administrative leave.

As further shown in FIG. 3, the other functioning watchdog monitors 333, 334 perform membership check operations 342, 343 respectively on each of their left-neighbor nodes, to determine if any of their neighboring nodes are not a functioning part of the compute cluster. After the membership check operation is completed in FIG. 3, nodes 311 and 315 are determined as not being functioning members of the cluster, whereas the membership of nodes 312, 313, and 314 is verified. The monitor component 332 can proceed with appropriate action in an attempt to re-establish the membership of nodes 311 and 315.

If the nodes 311 and 315 cannot be restored to full operation in the cluster, then the list of nodes within the cluster 300 will need to be updated. In one embodiment, non-functioning nodes in the cluster may be identified as being on "administrative leave." Nodes on administrative leave are ignored during right-neighbor health checks and left-neighbor power-on processing. The administrative leave status for all nodes may be stored in a file or data entry location that is shared by all nodes in the compute cluster, in order to provide a consistent view throughout the cluster. Nodes may also be placed on administrative leave by user actions to indicate that nodes should be temporarily ignored from the compute cluster.

The watchdog uses two threshold values (in one embodiment, values MaximumNumberOfNodeRefreshes and PeriodForMaximumNumberOfNodeRefreshes) to determine the number of node reboots within a period of time that will be tolerated before the watchdog monitor determines that the node should be removed from the cluster. To remove a node the watchdog may (a) place the node on administrative leave by creating an entry in the administrative leave file for the node with the attribute automaticleave set to the value true, and (b) power-down the node (performing a clean shutdown of the operating system in the process).

Figure 4:
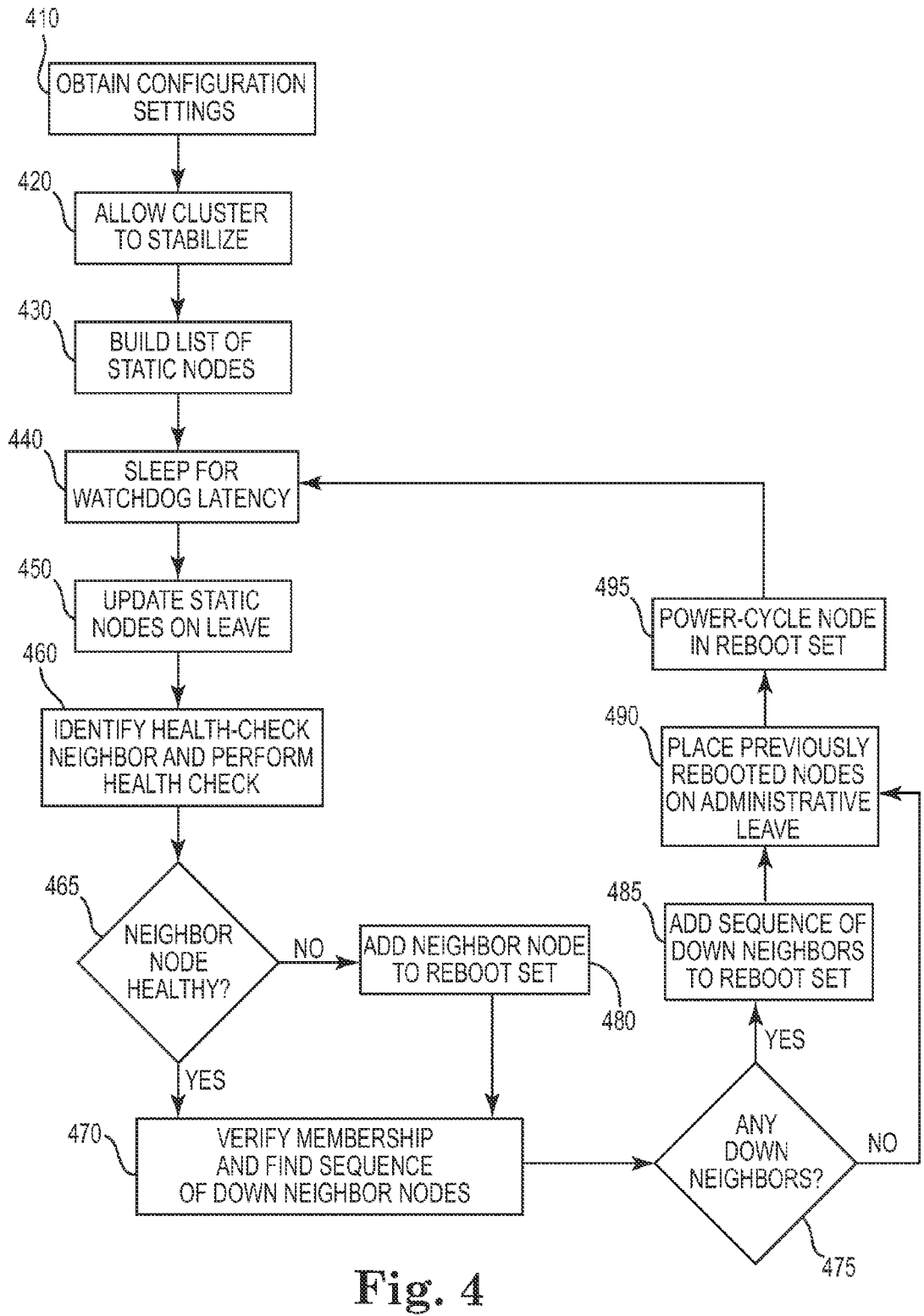
FIG. 4 illustrates a high-level flowchart of monitoring actions performed during health check and cluster membership check operations according to one embodiment of the present invention.

The high-level logic for a watchdog monitoring implementation according to one embodiment of the present invention is illustrated in FIG. 4. First, as shown in step 410, configuration settings are obtained relevant to the operation of the watchdog monitor. These configuration settings may include what type of logging or tracing level to perform within the watchdog, the amount of time to stabilize the cluster, the latency period to pause between watchdog health checks, the maximum number of node refreshes, and the period of time that a node can be refreshed multiple times before being placed on administrative leave.

Next, as shown in step 420, the cluster is allowed to "stabilize" and reach full operation before health and membership check operations are commenced. Once the cluster has sufficiently stabilized, then a static list of nodes of the cluster is built as in step 430. This list will provide a list of expected active and operational nodes within the cluster, thus giving the various nodes within the cluster a way to determine which neighbor nodes to perform health check and membership operations on.

Next, as depicted, the watchdog sleeps for a period of latency as in step 440. Once the period of latency is over, the watchdog functions may be commenced. Before performing any monitoring functions, the watchdog updates its list of nodes to remove any static nodes on administrative leave (or on leave for other reasons) as in step 450.

As in step 460, each node identifies its health check neighbor and performs a health check on every such neighbor using one or more of the previously described techniques. If the neighbor node is healthy as in step 465, then the watchdog moves on to membership verification of the node's other neighboring nodes as in step 470. If the neighbor node is not healthy as in step 465, then some remedial action is taken, such as adding the neighbor to the reboot set as in step 480, and then proceeds with the membership verification.

The membership verification process as in step 470 includes verifying if the neighbor node in the opposite direction of the health check node remains a valid functioning member of the cluster. If the neighbor node in the opposite direction is powered down or unavailable, then the next available node in the circular list is queried, to determine if that node is not functioning as well. In a further embodiment, the membership verification process will also exclude any nodes that were not previously placed on leave and not known to be powered down. Thus, during the membership verification process, the watchdog will discover any sequence of unexpectedly down neighbor nodes until the watchdog discovers a functioning node. If any down neighbors exist as in 475, then the down nodes will be added to the reboot set for remedial action as in step 485.

Prior to executing a power-cycle operation on the reboot set as in step 495, the watchdog monitor will verify that the nodes to be rebooted have not been previously rebooted. If the recognized unhealthy nodes have been unsuccessfully or repeatedly rebooted a certain number of times, they may be placed on administrative leave as in step 490. Administrative leave provides the opportunity to exclude non-functioning nodes entirely from the cluster rather than subjecting the nodes to more futile attempts at rebooting. As previously described, a setting specifying the number of times to attempt to reboot before placing on administrative leave may be a configuration parameter. Finally, with the list of down or non-functioning nodes identified in the cluster (the "reboot set"), the reboot set may be power-cycled as in step 495. The watchdog process then returns to step 440 for its next execution after the watchdog latency.

A further embodiment allows some internal health checking functions to be initiated from within a node itself. Therefore, in addition to Node A checking the health of Node B, Node A may do internal verification on itself (Node A) and its software components. However, to prevent performing a duplicative activity as the health check from a neighboring node, the watchdog may be configured to avoid cases where two actors perform the same health improvement. In a more realistic case, however, Node A will not be able to self-diagnose its own problems, but rather such health-checking function will need to be accomplished by an outside monitor running on a separate node.

The health-check and membership verification operations as described above each provide a significant advantage over a distributed health check, and provide a comprehensive monitoring view function rivaling a centralized approach. The health-check handles the simple case where the watchdog is not operating properly from multiple locations within the cluster. Even if watchdog on node B is malfunctioning, at most this will produce a false positive for the health status of Node C. Node C may have unnecessary action taken on but with little adverse results. Ultimately, the other nodes that are monitoring Node B, namely node A, will recognize the error in the watchdog and take corrective action. This may be accomplished by ensuring that one of the first health checks being performed is to validate the watchdog operation of the neighbor node. As an analogy, the first step of the "immune system" is to ensure that all the individual actors of the immune system are properly operating, before the individual actors can be trusted to proceed with detection and repair of problems.

Further, with use of the membership check functions as suggested above, the various embodiments of the present invention may function as a dynamic health check "ring" that can expand and contract based on the current state of components and the requirements of the compute cluster. Those skilled in the art would recognize that compute clusters may be of any number of size and permutations, and may include multiple software components within each node that are subject to selective amounts of monitoring. The watchdog monitor process may be modified to allow nodes to be added and removed at more frequent intervals. Further, the various actions taken by a watchdog in response to unhealthy software conditions may vary and is not limited to restarting or reinitializing the node or its software.

As will also be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for monitoring health and membership of distributed software in a compute cluster having a plurality of nodes, comprising:
    generating an ordered list of all nodes in the plurality of nodes configured to operate in the compute cluster;
    making the ordered list available to each of the plurality of nodes, each of the plurality of nodes having a watchdog component configured to perform health checks and membership checks on other nodes in the compute cluster;
    performing a health check by each node in the plurality of nodes using the watchdog component, the health check comprising:
        checking a health status of a first neighbor node in a first direction of the node in the ordered list of nodes; and
        performing a first action on the neighbor node responsive to determining that the health status of the first neighbor node is unhealthy; and
    performing a membership check by each node, using the watchdog component, on a second neighbor node in a second direction opposite the first direction, the membership check comprising:
        verifying membership in the compute cluster of a second neighbor node; and performing a second action on the second neighbor node responsive to determining that the second neighbor node is not a member of the compute cluster;
wherein the ordered list provides a circular sequence of nodes traversable in either the first direction or the second direction.

2. The method of claim 1, the membership check further comprising verifying membership in the compute cluster of additional neighbor nodes in the second direction responsive to determining that the second neighbor node is not a member of the compute cluster.

3. The method of claim 1, further comprising refreshing the ordered list of all nodes in the plurality of nodes configured to operate in the compute cluster.

4. The method of claim 1, further comprising repeating the health check and membership check steps from each node in the plurality of nodes having the watchdog component of the node in an operational state, the health check and membership check steps being repeated after a defined interval of time.

5. The method of claim 1, further comprising allowing the computer cluster to stabilize for a defined period of time prior to performing additional health check and membership check operations.

6. The method of claim 1, wherein the first action performed on the first neighbor node comprises restarting software components configured to execute on the first neighbor node.

7. The method of claim 1, wherein at least one of the first action and the second action performed on the first neighbor node and the second neighbor node respectively comprises power cycling hardware.

8. The method of claim 1, wherein the second action performed on the second neighbor node comprises placing the second neighbor node on administrative leave within the compute cluster.

9. The method of claim 1, wherein the first action and the second action performed on the first neighbor node and the second neighbor node respectively are each repeated a predefined number of times.

10. A method for monitoring health of nodes within a compute cluster having a plurality of nodes, comprising:
obtaining a list of nodes expected to operate within the compute cluster, each node of the list of nodes having an operational watchdog component;
performing a health check, by each node using the operational watchdog component, on a first neighbor node in a first direction of each node to discover unhealthy nodes in the compute cluster;
performing a membership check by each node using the watchdog component on a second neighbor node in a second direction opposite the first direction;
restoring the unhealthy nodes in the compute cluster to a healthy state; and
repeating the health check and membership check by each node using the operational watchdog component, the health checks comprising performing the health checks by nodes restored to the healthy state, wherein the list of nodes provides a circular sequence of nodes traversable in one of the first direction and the second direction.

11. A distributed cluster computing system, comprising:
a compute cluster comprising a plurality of nodes;
at least one processor within the distributed cluster computing system;
at least one memory store within the distributed cluster computing system having instructions operable with the at least one processor for monitoring health and membership of distributed software operating across the plurality of nodes, the instructions being executed on hardware components within the distributed cluster computing system for:
generating an ordered list of all nodes in the plurality of nodes which are configured to operate in the compute cluster;
making the ordered list available to each of the plurality of nodes, each of the plurality of nodes having a watchdog component configured to perform health checks and membership checks on other nodes in the compute cluster;
performing a health check by each node using the watchdog component, the health check comprising:
checking a health status of a first neighbor node, to a first direction, by each node; and
performing a first action on the first neighbor node responsive to determining that the health status of the first neighbor node is unhealthy; and
performing a membership check by each node using the watchdog component, the membership check including:
verifying membership in the compute cluster of a second neighbor node in a second direction, opposite of the first direction of a second neighbor node; and
performing a second action on the second neighbor node responsive to determining that the second neighbor node is not a member of the compute cluster;
wherein the ordered list provides a circular sequence of nodes traversable in either the first direction or the second direction.

12. The distributed cluster computing system of claim 11, the membership check further comprising instructions being executed for verifying membership in the compute cluster of additional neighbor nodes to the second direction of the healthy node in the ordered list of nodes responsive to determining that the second neighbor node is not a member of the compute cluster.

13. The distributed cluster computing system of claim 11, further comprising instructions being executed for refreshing the ordered list of all nodes in the plurality of nodes configured to operate in the compute cluster.

14. The distributed cluster computing system of claim 11, further comprising instructions being executed for repeating the health check and membership check steps from each node in the plurality of nodes having the watchdog component of the node in an operational state, the health check and membership check steps being repeated after a defined interval of time.

15. The distributed cluster computing system of claim 11, further comprising instructions being executed for allowing the computer cluster to stabilize for a defined period of time prior to performing additional health check and membership check operations.

16. The distributed cluster computing system of claim 11, wherein the first action performed on the first neighbor node includes restarting software components configured to execute on the first neighbor node.

17. The distributed cluster computing system of claim 11, wherein at least one of the first action and the second action performed on the first neighbor node and the second neighbor node respectively comprises power cycling hardware.

18. The distributed cluster computing system of claim 11, wherein the second action performed on the second neighbor node includes placing the second neighbor node on administrative leave within the compute cluster.

19. The distributed cluster computing system of claim 11, wherein the first action and the second action performed on the first neighbor node and the second neighbor node respectively are each repeated a predefined number of times.

20. A distributed cluster computing system, comprising:
a compute cluster comprising a plurality of nodes;
at least one processor within the distributed cluster computing system;
at least one memory store within the distributed cluster computing system having instructions operable with the at least one processor for monitoring health of the plurality of nodes, the instructions being executed on hardware components within the distributed cluster computing system for:
obtaining a list of nodes expected to operate within the compute cluster, each node having an operational watchdog component;
performing a health check, by each node within using the operational watchdog component, on a first neighbor node in a first direction of each node to discover unhealthy nodes in the compute cluster;
performing a membership check, by each node using the watchdog component, on a second neighbor node in a second direction opposite the first direction;
restoring the unhealthy nodes in the compute cluster to a healthy state; and
repeating the health check and membership check by each node using the operational watchdog component, the health checks comprising performing the health checks by nodes restored to the healthy state, wherein the list of nodes provides a circular sequence of nodes traversable in one of the first direction and the second direction.

* * * * *